United States Patent [19]

Chaplin

[11] Patent Number: 4,967,277
[45] Date of Patent: Oct. 30, 1990

[54] NON-LINEAR KEYER

[75] Inventor: Daniel J. Chaplin, Nevada City, Calif.

[73] Assignee: The Grass Valley Group, Inc., Nevada City, Calif.

[21] Appl. No.: 418,354

[22] Filed: Oct. 6, 1989

[51] Int. Cl.⁵ .............................................. H04N 5/22
[52] U.S. Cl. .................... 358/183; 358/181; 358/182
[58] Field of Search ............... 358/181, 182, 183, 172, 358/22

[56] References Cited

U.S. PATENT DOCUMENTS

| 3,602,646 | 8/1971 | Goldberg | 358/183 X |
| 4,001,498 | 1/1977 | Morishita et al. | 358/183 X |
| 4,028,727 | 6/1977 | Skrydstrou | 358/181 |
| 4,141,041 | 2/1979 | Peters | 358/183 |
| 4,160,994 | 7/1979 | Mendrala | 358/22 |
| 4,218,711 | 8/1980 | Kashigi | 358/183 |
| 4,887,159 | 12/1989 | Chaplin | 358/183 |

Primary Examiner—Howard W. Britton
Assistant Examiner—Mark R. Powell
Attorney, Agent, or Firm—Francis I. Gray

[57] ABSTRACT

A non-linear keyer breaks a key processor transfer function into two pieces, one above and one below a clip level. Each piece may be modified independently and then recombined to produce the desired non-linear transfer function.

4 Claims, 2 Drawing Sheets

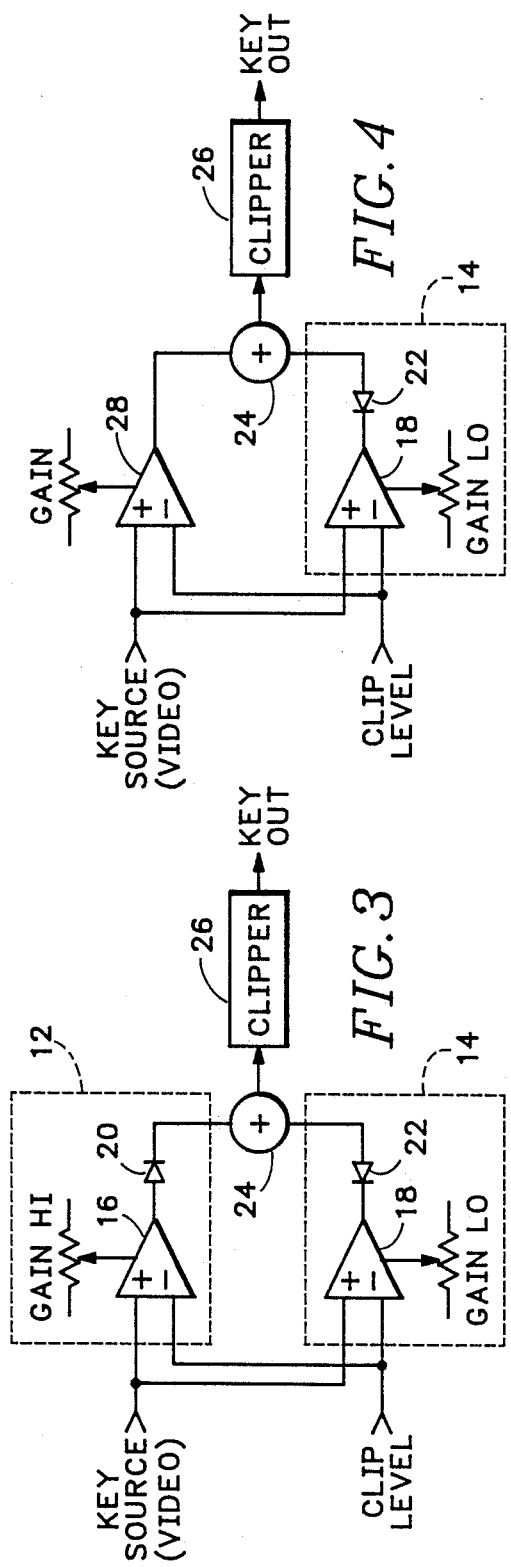

NON-LINEAR KEYER

BACKGROUND OF THE INVENTION

The present invention relates to video keyers, and more particularly to a non-linear keyer for increasing the selectivity of a key control signal used to insert key fill video into a background video by modifying the key processor transfer function.

In a traditional keyer there is a problem with setting the clip level since there are many times when more selectivity is desired above or below the clip level. Varying the gain helps, but the result often appears compromised. A high gain gives good selectivity to exclude some unwanted part of a key source, but can give harsh edges to the key control signal.

What is desired is a non-linear keyer that can vary the gain independently above and below the clip level.

SUMMARY OF THE INVENTION

Accordingly the present invention provides a non-linear keyer that introduces a non-linearity around a clip level such that the gain below the clip level may be set independently of the gain above the clip level. The key source video and the clip level are input to two opposite polarity absolute value variable amplifiers that split the key transfer function into two pieces. The positive amplifier forms the positive portion of the transfer function above the clip level, and the negative amplifier forms the negative portion. A summing amplifier combines the two transfer functions from the absolute value amplifiers, and a clipper truncates the result at maximum and minimum control levels required by a circuit being controlled.

The objects, advantages and novel features of the present invention are apparent from the following detailed description when read in conjunction with the appended claims and attached drawing.

BRIEF DESCRIPTION OF THE DRAWING

FIG. 1 is a traditional keyer transfer function.

FIGS. 2a and 2b are non-linear keyer transfer functions according to the present invention.

FIG. 3 is a block diagram view of a first embodiment of a non-linear keyer according to the present invention.

FIG. 4 is a block diagram view of a second embodiment of a non-linear keyer according to the present invention.

DESCRIPTION OF THE PREFERRED EMBODIMENT

Figure 5:
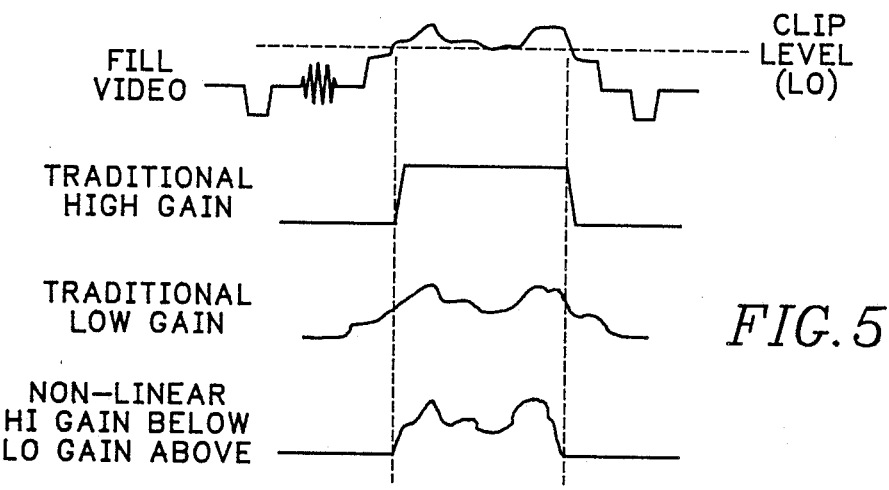
FIG. 5 is a graphic comparison of traditional and non-linear key signals for a low luminance video signal.

FIG. 1 illustrates a transfer function for a traditional keyer. The transfer function has a single slope between minimum and maximum allowed values so that there is no difference in selectivity above and below a clip level. FIGS. 2a and 2b illustrate the concept of the present invention. In both transfer functions there is a non-linearity at the clip level so that the transfer function is broken into two pieces—one piece above the clip level and the other below the clip level. Each piece has a slope that may be set independently of the other so that the transfer function may have a high gain below the clip level and a low gain above the clip level, as in FIG. 2a, or vice versa as in FIG. 2b.

A key source video signal is input together with a clip level signal to a pair of opposite polarity absolute value variable amplifiers 12, 14, as shown in FIG. 3, that simulate ideal diodes with variable gain. The amplifiers 12, 14 each have a differential input amplifier 16, 18 that each have an independent gain control, GAIN HI or GAIN LO. The outputs of the differential amplifiers are input to respective diodes 20, 22 that are connected to the respective differential amplifier outputs in opposite polarities. The output of the first absolute value amplifier 12 is at the clip level so long as the key source video is below the clip level, and is an amplified value of the key source video signal when above the clip level. In like manner the output of the second absolute value amplifier 14 is an amplified value of the key source video signal so long as the video signal is below the clip level, and is at the clip level when the video signal exceeds the clip level. The respective outputs are input to a summing amplifier 24 to join the two pieces of the transfer function from the absolute value amplifiers 12, 14. A clipper circuit 26 truncates the transfer function to the maximum and minimum voltage levels determined by a circuit to be controlled by the resulting key signal, such as between zero and one volts.

An alternative embodiment is shown in FIG. 4 that is based upon the observation that most of the time the extra gain in the transfer function is useful only below the clip level, and not above. The positive absolute value variable amplifier 12 becomes a linear variable amplifier 28 that defines the minimum gain in the transfer function. The other amplifier 14 is still a negative absolute value variable amplifier that serves to increase the gain below the clip level. When the negative absolute value variable amplifier 14 gain is set to zero, the circuit performs in the same manner as a traditional key processor.

As is well known in the art the clipper circuit 26 may include additional circuit features that smooth the transition of gains around the clip threshold and at the maximum and minimum levels.

Figure 6:
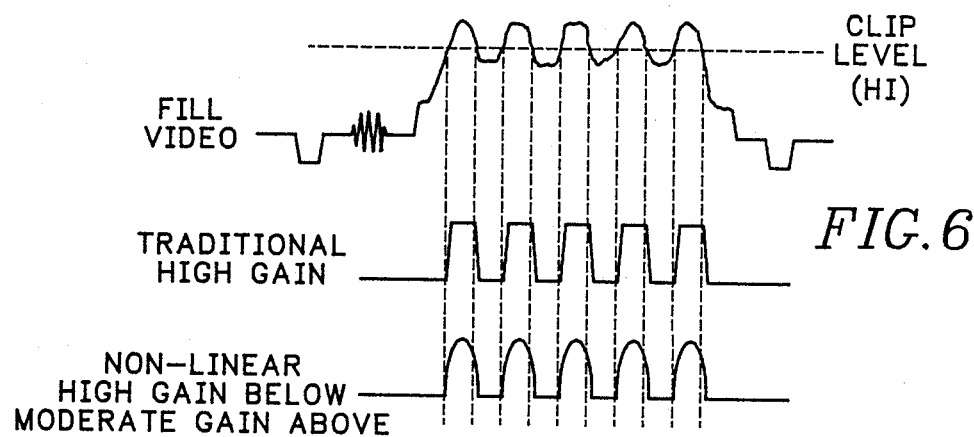
FIG. 6 is a graphic comparison of traditional and non-linear key signals for a high luminance video signal.
Figure 7:
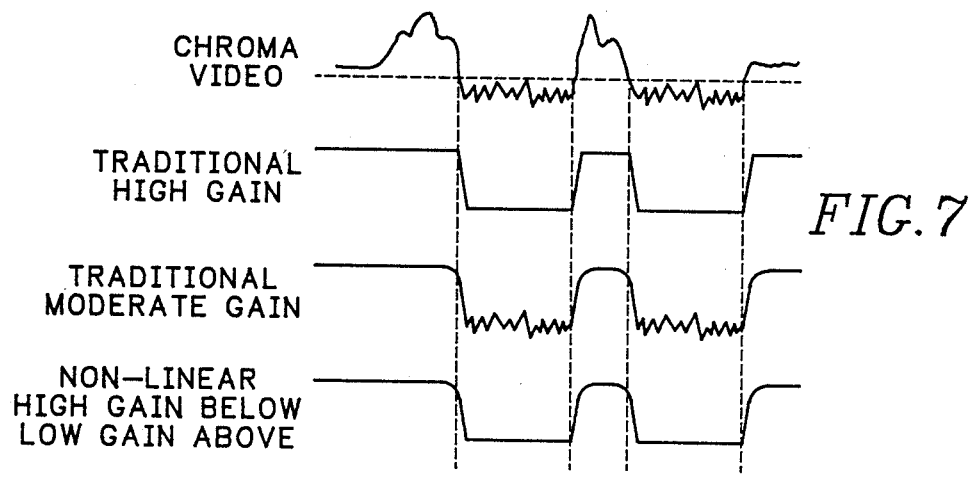
FIG. 7 is a graphic comparison of traditional and non-linear key signals for a noisy chrominance video signal.

FIGS. 5–7 illustrate situations where a non-linear keyer such as described above might find useful applications. In FIG. 5 a self key signal from a fill video source with low luminance content requires a low clip level to select the desired low luminance. Using a traditional keyer with high gain results in a harsh edge to the key signal, while low gain results in setup interferences, i.e., a portion of the signal not desired shows through. However the non-linear keyer can use high gain below the clip level to prevent setup interferences and a low gain above the clip level to provide soft edges. In FIG. 6 a self key signal from a fill video signal having high luminance values that are undesirable requires a high clip level. In a traditional key with high gain there are harsh edges to the resulting key signal, while using the non-linear keyer with high gain below the clip level and moderate gain above the clip level the edges are softened. Finally in FIG. 7 for a chroma key source that requires high noise immunity the clip level is set above the noise level. Again a traditional keyer with high gain results in harsh edges, while a moderate gain allows some of the noise to come through. The non-linear keyer with high gain below the clip level effectively eliminates the noise, while the low gain above the clip level provides soft edges.

Thus the present invention provides a non-linear keyer that divides the key processor transfer function into two pieces about the clip level, modifies each piece independently and recombines the pieces to produce the desired non-linear transfer function.

What is claimed is:

1. A non-linear keyer having a key source video signal and a clip signal as inputs comprising:
   means for separating a key transfer function into two pieces, one piece being applied to values of the key source video signal above the clip signal and the other piece being applied to values of the key source video signal below the clip signal;
   means for independently varying the slope of the transfer function for each piece; and
   means for combining the two pieces to form a desired non-linear transfer function for the key source video signal.

2. A non-linear keyer having a key source video signal and a clip signal as inputs comprising:
   a positive absolute value variable amplifier to which the key source video signal and the clip signal are input to independently amplify values of the key source video signal above the clip signal with a first gain value;
   a negative absolute value variable amplifier to which the key source video signal and the clip signal are input to independently amplify values of the key source video signal below the clip signal with a second gain value; and
   means for combining the outputs of the absolute value variable amplifiers to produce a non-linear transfer function for the key source video signal.

3. A non-linear keyer having a key source video signal and a clip signal as inputs comprising:
   a linear variable amplifier to which the key source video signal and the clip signal are input, the linear variable amplifier having a first gain value;
   a negative absolute value variable amplifier to which the key source video signal and the clip signal are input, the negative absolute value variable amplifier having a second gain value independent of the first gain value; and
   means for combining the outputs from the variable amplifiers to produce a non-linear transfer function for the key source video signal.

4. A method of generating a non-linear transfer function for a key signal generator having a key source video signal and a clip signal as inputs comprising the steps of:
   separating a key transfer function into two pieces, one above the clip signal and the other below the clip signal;
   independently varying the slope of each piece of the key transfer function; and
   combining the two pieces of the key transfer function to produce the non-linear transfer function.

* * * * *